Patented Sept. 3, 1940

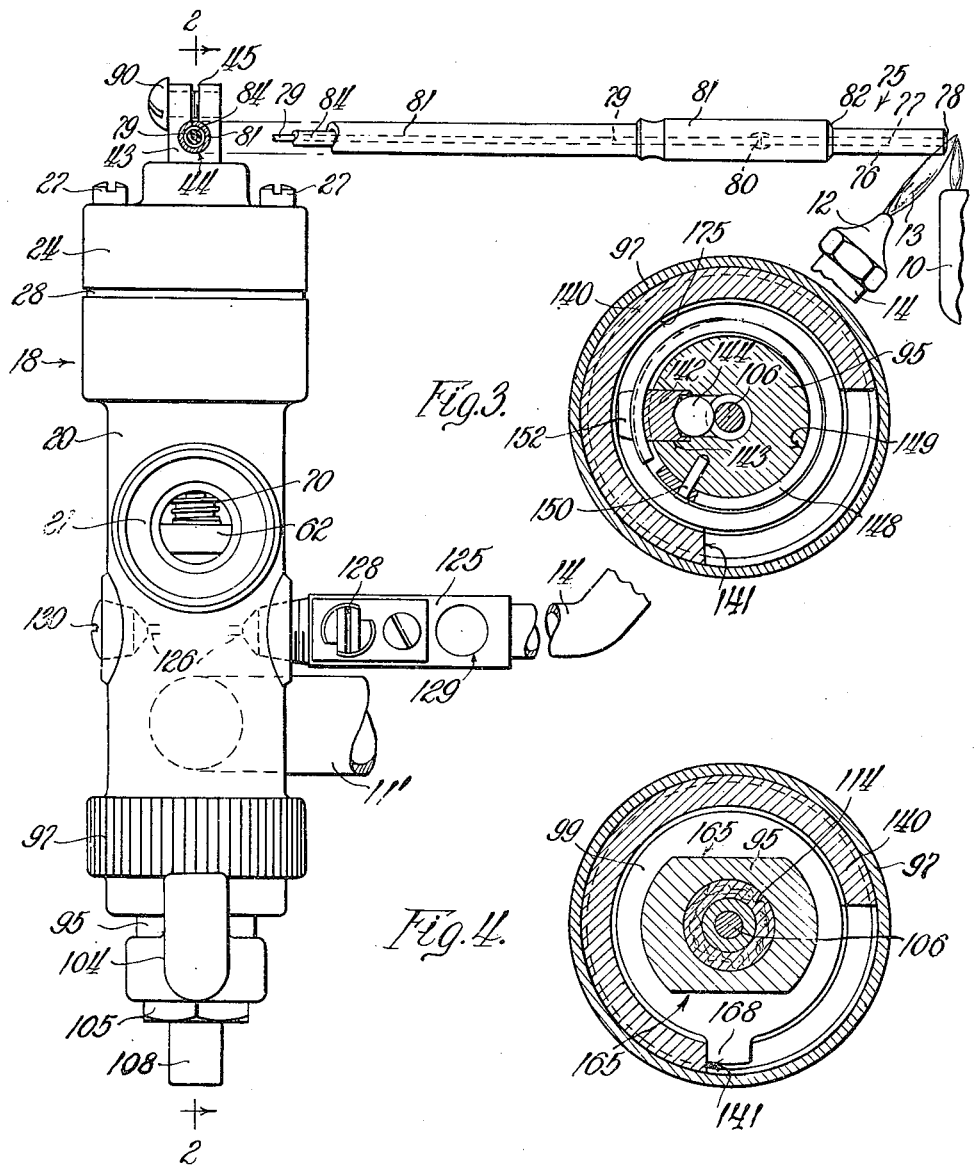

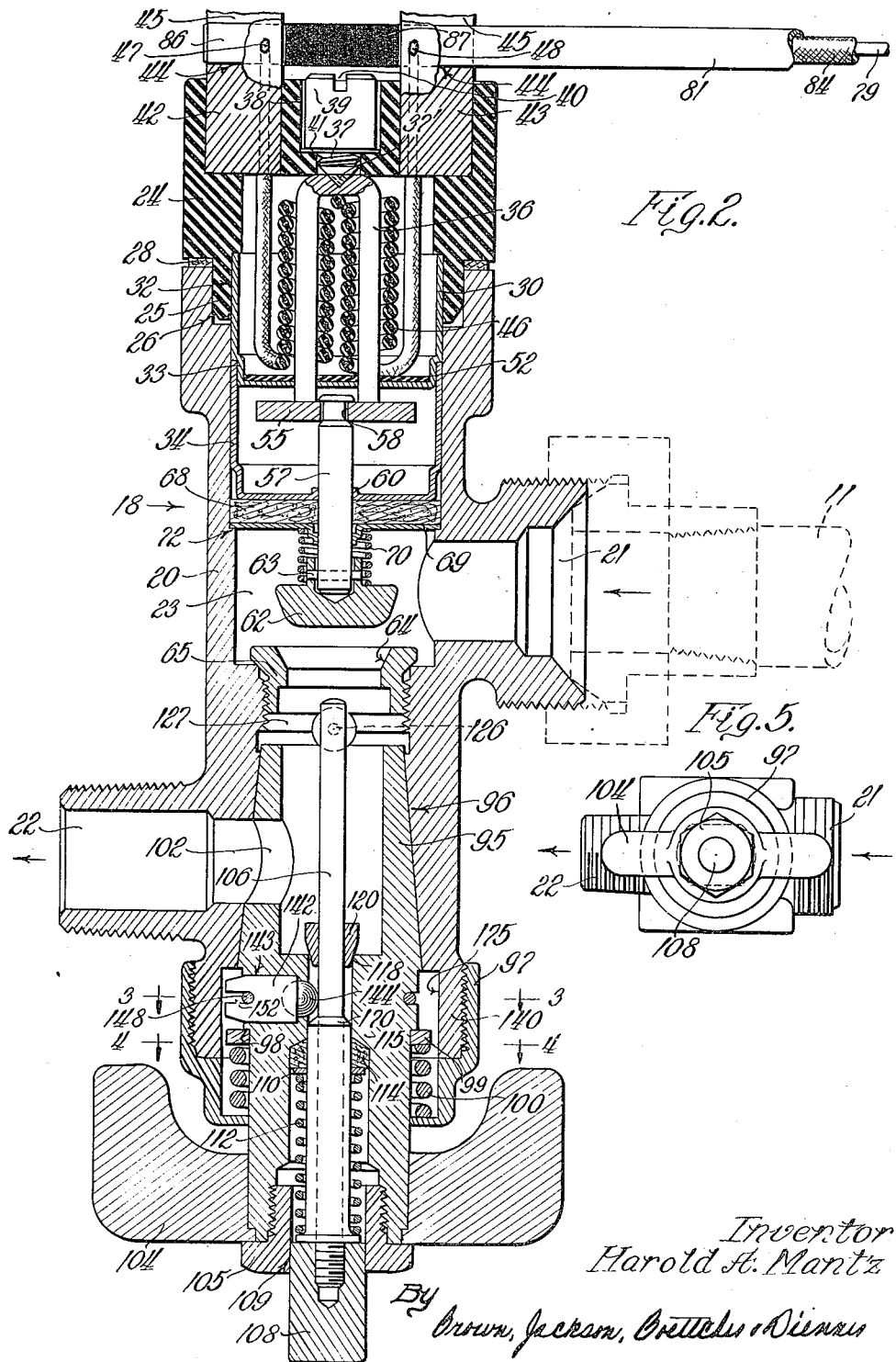

2,213,844

UNITED STATES PATENT OFFICE 2,213,844

SAFETY CONTROL AND SHUTOFF DEVICE

Harold A. Mantz, Milwaukee, Wis., assignor to Milwaukee Gas Specialty Company, Milwaukee, Wis., a corporation of Wisconsin Application November 10, 1938, Serial No. 239,795

18 Claims. (Cl. 137—139)

This invention relates to a safety control and shutoff device.

The illustrated embodiment of the invention is in the form of a combined thermo-electric safety control device and shutoff cock of the general character shown and described in the copending application of John H. Thornbery, filed November 10, 1938, Serial No. 239,791.

While the particular device which I shall describe hereinafter in connection with the drawings has the valve member of the thermo-electric control device connected to the armature for movement to open and closed positions with movement of the armature to attracted and retracted positions, it is to be understood that the invention is not limited to use in this particular form of device but may be employed in all similar forms of devices—by way of example, in devices in which the movement of the armature controls a switch connected in circuit with a solenoid valve which is operable to open and close the fuel supply line to the burner.

One of the main objects of my invention is to provide means which will permit resetting the armature to the position in which it is apated to be held by the electromagnet and the valve controlled thereby to open position only when the shutoff cock is closed to shut off the supply of fuel to the burner and which means is operable to prevent resetting of the control device when the shutoff cock is in open position.

In its more specific aspects this means for permitting resetting of the control device only when the shutoff cock is closed and for preventing resetting of the control device when the shutoff cock is in open position is in the form of an interlock which acts to prevent resetting movement of the reset stem when the shutoff cock is open and permits resetting movement of the reset stem when the shutoff cock is closed.

It is also an object of my invention to provide a combined safety control device, shutoff cock and interlock of relatively simple and inexpensive construction, and which may be installed and operated conveniently and effectively; also a device of this character composed of relatively few parts and adapted for convenient and expeditious manufacture and assembly.

Further objects and advantages of the invention will be apparent from the following detailed description taken in connection with the accompanying drawings, in which:

Figure 1 is an elevational view of a safety control and shutoff device embodying the present invention, showing the same more or less diagrammatically in a pilot burner and main burner fuel supply system;

Figure 2 is an axial section through the safety control and shutoff device on an enlarged scale and taken on the line 2—2 of Figure 1;

Figure 3 is a detail section taken on the line 3—3 of Figure 2;

Figure 4 is a detail section taken on the line 4—4 of Figure 2; and

Figure 5 is a bottom plan view of the device shown in Figure 2, on a reduced scale.

Referring to the drawings, the burner 10, shown fragmentarily in Figure 1, is any suitable or preferred main burner—by way of example, for an oven, or for a room heater or a water heater, or it may be one of the main top burners of a gas range, or any other main burner.

A pipe 11' supplies gaseous or other suitable fuel to the burner 10, and disposed in juxtaposition to the burner 10 is a pilot burner 12 which maintains a pilot light 13 for igniting the main burner. The pilot burner 12 is supplied with fuel by a tube 14 connected to the valve body of the thermo-electric control device as will be hereinafter described, although it is to be understood that this pilot fuel supply tube 14 may be connected otherwise, for example to the pipe 11 anterior to the control device.

The thermo-electric control device, designated in its entirety at 18, comprises a valve body 20 having an inlet 21 and an outlet 22 for connection into the fuel supply pipe 11. The thermocouple and lead conductor means therefor is shown broken away in Figure 1 and at right angles to the position in which the terminal means for the thermocouple is connected to the control device. This is merely for facility of illustration.

The lead connection cap and magnet and armature housing assembly is of the general character disclosed and claimed in the copending application of Clarence Wantz, filed November 10, 1938, Serial No. 239,790. The lead connection cap 24, which is preferably formed of "Bakelite" or any other suitable or preferred insulating material, may be of the external form shown in Figure 1 and has at its lower end, as viewed in Figure 2, an integral cylindrical extension 25 which fits into a counterbore 26 at the upper end of the bore 23 in the valve body 20. The cap 24 is fastened in place upon the top of the valve body 20 by cap screws 27, preferably with a sealing gasket or washer 28 between the cap and the valve body.

The magnet housing 30 is in the form of an upwardly opening cup-shaped metal shell mounted on the cap 24, for example by secure pressed fit engagement of its open upper end in the cap 24 at 32. The housing or shell 30 is reduced at its lower end at 33, and the armature housing 34, which is also in the form of an upwardly opening cup-shaped metal shell, is mounted on the shell 30, for example by secure pressed fit engagement of its open upper end telescopically over the reduced lower end 33 of the shell 30. The lower end of the shell 34 is preferably reduced, as shown.

The electromagnet comprises a generally U-shaped magnet frame 36 positioned within the shell 30, with its legs extending through openings in the lower end of this shell and presenting pole ends within the armature housing 34. The magnet frame 36 has a threaded stud 37 welded or otherwise rigidly joined thereto at 37', or formed integral therewith. This stud 37 extends into an opening or recess 38 in the top of the cap 24 and has threaded engagement with a nut member 39 for clamping the magnet frame rigidly and, at the same time, removably in place. The nut member 39 has a kerf 40 for engagement by a screw driver or other suitable tool, and a spring washer may be provided between the nut member 39 and the bottom of the recess 38 as indicated at 41.

Fixed rigidly in the cap 24, as, for example, by molding the insulating material of the cap thereto and extending endwise from the cap, are a pair of spaced metallic terminal connectors 42 and 43 having aligned openings 44 and split outwardly of these openings as shown at 45. The electromagnetic coil 46 surrounds the legs of the magnet frame 36 and the leads or ends of this coil extend out through the terminal connectors 42 and 43 and have their bared ends connected to the terminal members 42 and 43 at 47 and 48, respectively, in a manner to have good conducting contact therewith. The connections at 47 and 48 are shown disposed outside of the cap 24 and laterally of the openings for receiving the terminal means on the terminal lead conductors. The coil 46 is preferably covered with insulation between its bared ends. Suitable insulation may, if and as desired, be interposed between the turns of the coil and the legs of the magnet frame 36, and insulation may be provided between the lower ends of the shell 30 and the adjacent end of the coil 46 as shown, by way of example, at 52.

The armature 55 is disposed in the armature housing 34 and is adapted to be held in attracted position against the pole ends of the magnet frame 36 upon energization of the electromagnet. The armature 55 is of disc-like form, and is secured to the upper end of a reciprocatory valve stem 57. The attachment of the armature to the valve stem 57, at 58, is preferably sufficiently loose, as indicated, to permit self-accommodation of the armature to the pole ends of the magnet frame by a generally universal movement of the armature upon the upper end of the valve stem. The stem 57 is disposed generally concentrically of the armature housing 34 and extends downwardly for reciprocating movement through an opening 60 in the lower end of the housing 34.

The valve member 62 is fixed by a pin 63 upon the lower end of the valve stem 57, preferably for some relative movement thereon so as to have self-accommodating seating engagement with the cooperating valve seat 64 at the upper end of the valve seat member 65. Packing 68, of felt or other suitable or preferred material, is interposed between the bottom of the armature housing 34 and a metal valve spring seating disc 69. The valve spring 70 is in the form of a coiled compression spring interposed between the valve member 62 and the spring seating disc 69, and centered, if desired, at opposite ends about integral hub-like portions on the valve member 62 and valve seating disc 69. The spring 70 resiliently moves the armature 55 to retracted position and the valve member 62 into seating engagement with the valve seat 64 to shut off the flow of fuel to the outlet 22 and thereby to the main burner 10 when the electromagnet is deenergized.

The disc 69 seats downwardly upon a shoulder 72 in the bore 23 of the valve body 20, and the action of the spring 70 tends to compress the packing 68 and maintain same in sealing engagement with the bore 23 and the valve stem 57 to seal the interior of the armature housing 34 from the gaseous or other fuel which passes through the valve body, and to seal the valve body against the escape of fuel out around the connection cap and magnet and armature housing assembly. The device is further sealed against the escape of fuel by the gasket or washer 28.

The lead connection cap and magnet and armature housing assembly is of simple and inexpensive construction, and is adapted to be applied to and removed from the valve body 20 or similar structure expeditiously and as a unitary structure. At the same time the armature housing 34 is detachable from the magnet housing 30 to permit access to the armature 35 and the pole ends of the magnet frame 36. The magnet housing 30 may also be adapted for detachment from the lead connection cap 24 to permit access to the magnet frame 36 and magnet coil 46.

The thermocouple and lead connection therefor are of the general character disclosed and claimed in Oscar J. Leins Patent No. 2,126,564, granted August 9, 1938. The thermocouple 75 comprises an outer tubular metallic thermocouple member 76 and an inner metallic thermocouple member 77 disposed within the outer thermocouple member and joined at one end to the end of the outer thermocouple member to form the thermal junction 78 which is placed in position to be heated by the pilot light 13. An inner lead conductor 79 is joined to the inner thermocouple member to form an internal thermal junction 80, and an outer tubular lead conductor 81 is connected to the outer tubular thermocouple member through a sleeve 81' to form a third thermal junction 82. The outer lead conductor 81 encloses the inner lead conductor and the inner thermocouple member 80. The inner lead conductor 79 is insulated from the outer lead conductor by a wrapping of insulation on the inner lead conductor, as indicated at 84.

The inner and outer lead conductors 79 and 81 are preferably of a character that will permit bending, as desired, to permit disposing the thermocouple in any desired position. At the same time, the lead connection is preferably of a character to support the thermocouple in any desired position, although supporting brackets or other means may be employed for supporting the thermocouple and lead connection. At the opposite end, the inner lead conductor 79 extends from the outer lead conductor 81, and has a metallic terminal sleeve 86 fixed thereon in good conductive contact therewith and spaced from the end of the outer lead conductor 81. An insulating sleeve 87 is interposed between the terminal sleeve 86 and the adjacent end of the outer lead conductor 81.

A quick detachable connection is thus provided between the thermocouple lead and the terminals 42 and 43 for the electromagnet coil 46. The thermocouple is connected to the terminals 42 and 43 by slipping the terminal end of the thermocouple lead means through the opening 44 in one terminal 43 and into the opening 44 in the other terminal 42, with the terminal sleeve 86 in the opening 44 in one terminal 42 and the end of the tubular thermocouple lead 81 in the opening 44 in the other terminal 43. The screws 90 are then tightened to clamp the split portions 45 of the terminals 42 and 43 into good conductive contact and gripping engagement with the terminal sleeve 86 and tubular lead 81, respectively. The thermocouple is disconnected from the device by loosening the screws 90 and withdrawing the terminal end of the thermocouple leads from the terminals 42 and 43.

The quick detachable connection thus provided permits the thermocouple, with its leads, to be detached from the control device in shipment. At the same time, the thermocouple may be connected to the control device expeditiously, and, when connected, good conductive contact is assured. This is important where the current is a relatively weak thermoelectric current such as that produced by the heat of the pilot light 13 on the thermal junction 78 of the thermocouple.

The heat of the pilot light 13 upon the thermocouple is sufficient to hold the armature 55 in attracted position and the valve member 62 in open position, as shown, when the armature is engaged with the pole ends of the magnet frame, but this thermo-electric current is not capable of moving the armature to attracted position and the valve member 62 to open position. In order, therefore, to provide for opening the valve member 62 and for setting the armature to attracted position upon initial operation of the device, and to reset the device after the same closes to shut off the fuel supply when the pilot light is extinguished, reset means is provided, and this reset means is combined with the shutoff cock generally in the manner described and claimed in the copending application of John H. Thornbery, filed November 10, 1938, Serial No. 239,791.

The shutoff cock is in the form of a hollow truncated conical plug 95, with its conical surface seated in a corresponding truncated conical bore 96 in the lower end of the valve body 20. Treaded upon the lower end of the valve body 20 is a spring cap 97 which may be knurled externally as shown in Figure 1. Disposed within the cap 97 and abutting a shoulder 98 on the plug member 95 is a stop or abutment disc 99. A coiled spring 100 is interposed between the stop or abutment disc 99 and the lower end of the cap 97, and acts to maintain the conical surface of the plug 95 resiliently and, at the same time, tightly seated in the bore 96. The plug 95 has an opening or port 102 which is adapted to be moved into and out of register with the outlet 22 by rotation of the plug 95.

For the purpose of rotating the plug 95, its outer end has a handle piece or knob 104 fixed thereon. The handle 104 may be fixed upon the plug 95 to turn the same therewith—for example, by splaying the outer end of the plug member 95 and providing the handle 104 with a correspondingly formed opening for locking engagement therewith. A handle screw 105, threaded internally to the outer end of the plug member 95 and having its head cooperating with the handle member 104 as shown, locks the handle member removably in place upon the plug 95.

The reciprocatory reset stem 106 is disposed centrally within the shut-off plug member 95 in position coaxial with the valve member 62. Its lower end projects from the lower end of the handle screw 105 and has a reset button 108 threaded or otherwise fixed thereon. The reset button 108 has sliding movement in the axial opening 109 in the screw 105, and interposed between the reset button or a flange on the adjacent end of the stem 106 and a spring disk 110 is a coiled reset return spring 112. Packing 114 is interposed between the spring disk 110 and an internal flange 115 on the plug member 95. The stem 106 has reciprocatory movement through the disk 110 and packing 114 and in the plug member 95.

The upper surface of the flange 115 presents a valve seat 118, and fixed on the stem 106 for reciprocatory movement therewith is a reset valve member 120. In the position shown, the valve member 120 is seated upon the seat 118 by the spring 112, which returns the reset stem to projected position and prevents the escape of fuel outwardly along the stem 106 and reset button. The packing 114 acts cumulatively with the valve member 120 to prevent the escape of fuel when the valve member 120 is seated as shown, and the packing 114 prevents the escape of fuel outwardly along the stem 106 during the resetting operation.

The tube 11 for supplying fuel to the pilot burner 12 is connected through a connector fitting 125 (Figure 1) and a port 126 (Figure 2) to the valve chamber 127. The port 126 opens into the chamber 127 below the valve seat 64 and above the upper end of the plug 95, so that when the valve 62 is open, fuel will be supplied to the pilot burner regardless of whether the shutoff plug 95 is open or closed. The connector fitting 125, through which fuel is supplied to the pilot burner, is provided with means indicated at 128 for shutting off the supply of fuel to the pilot burner and with a metering screw 129 for metering the supply of fuel to the pilot burner.

In the illustrated embodiment of the invention, two diametrically opposite pilot supply ports 126 are provided as shown in Figure 1. Each port 126 is provided with an internally threaded coaxial opening so that the fitting 125 may be threaded into either such opening selectively as desired. The other opening is closed by a removable screw 130.

For the purpose of permitting resetting of the armature 55 to the position in which it is adapted to be held by the electromagnet and the valve 62 to open position only when the shutoff cock is closed, i. e., only when the cock 95 is turned to position in which the opening or port 102 is completely out of register with the outlet 22 and to permit resetting of the control device when the shutoff cock is open, i. e., in position with the port or opening 102 in partial or complete registration with the outlet 22, the lower threaded end 140 of the valve body 20 is cut away or removed through approximately one-quarter of its circumference to form an opening 141.

An interlocking pin 142 is mounted for sliding movement in a lateral opening 143 in the plug 95 in the plane of the opening 141. A ball member 144, also slidable in the opening 143, is disposed between the inner end of the pin 142 and the reset stem 106. An annular spring wire 148, disposed in an annular recess 143 in the plug 95 and secured at one end to the plug at 150, engages at its opposite end in a groove 152 in the interlocking pin 142, and normally holds this pin yieldingly in retracted position within the inner periphery of the adjacent end 140 of the valve body 20. The disk 99 is fixed on the lower end of the valve plug 95 against turning movement relative thereto by splaying the sides of the plug, as indicated at 165 in Figure 4, and forming the opening in the disk 99 of conforming configuration. The disk 99 has a lug 168 which operates in the slot or circumferential opening 141 and limits the rotation of the shutoff cock to about 90 degrees, in one extremity, with the port 102 in full registration with the outlet 22 and, at the other extremity, with the port 102 completely out of register with the outlet 22.

When the plug 95 is in position with the shutoff port 102 completely out of registration with the outlet 22, the pin 142 is in register with the circumferential opening 141 in the valve body. Then when the reset sleeve 106 is pressed upwardly, the shoulder 170 (Figure 2), formed by a sleeve or enlarged portion on the stem 106 by engagement with the ball member 144, forces the pin 142 out radially into the opening 141 against the tension of the spring 148, freeing the reset stem for completion of the resetting operation. When, however, the plug 95 is in position with the shutoff port 102 completely or partially in register with the outlet 22, the pin 142 is out of register with the circumferential opening 141 in the lower end of the valve body. If it is attempted to press the reset stem 106 upwardly to reset the device with the plug 95 so positioned, the pin 142, as the shoulder 170 tends to force same outwardly, engages the inner periphery 175 of the lower end of the valve body, and the ball member 144 is then incapable of moving outwardly sufficiently to free the reset stem 106 for completion of the resetting operation.

The foregoing provision assure against escape of fuel from the main burner during the resetting operation, because the plug 95 must be rotated to shutoff position to free the interlock device so that the armature may be reset to attracted position and the valve 62 to open position. At the same time, when the plug 95 is turned to shutoff position, the interlock device is freed and the reset stem 106 is then capable of sufficient upward movement to reset the device.

The operation of the device is as follows:

When the pilot light is burning, the heat thereof upon the thermal junction 78 produces a thermo-electric current in the coil 46. The magnet frame 35 and armature 55 are preferably formed of an alloy of relatively low magnetic reluctance, and, as a result, the relatively weak thermoelectric current produces a magnetic field of sufficient strength so that when the armature 55 is placed in contact with the pole ends of the magnet frame by pushing the reset button 108 upwardly, the magnetic attraction holds the armature in raised or attracted position against the magnet frame with a force greater than the force exerted by the spring 70, thereby holding the valve 62 in open position so long as the pilot flame is burning.

If the pilot flame is extinguished, the holding action of the electromagnet ceases to be sufficient to hold the armature 55 and valve 62 in attracted position, and the spring 70 moves the valve member 62 to closed position. The armature 55 moves to retracted position with the movement of the valve 62 to closed position, and the closing of the valve 62 shuts off the supply of fuel to the main burner and pilot burner.

When it is desired to reset the device, the shutoff plug 95 is turned, by grasping the handle 104, to position completely to shut off the supply of fuel to the main burner. This releases the interlock, and the reset button 108 is engaged with the hand and pressed upwardly. The accompanying upward movement of the stem 106 brings the upper end of the stem into contact with the valve member 62, and continued upward movement of the reset stem moves this valve member and the valve stem 57 and armature 55 upwardly as a unit until the armature comes into contact with the pole ends of the magnet frame 36, or is brought into attracted position and the valve member 62 is positioned in open position as shown. This operation opens the supply of gas or other fuel to the pilot burner 12 only.

If the pilot burner is lighted and sets up a thermoelectric current to hold the armature in attracted position, the valve 62 will remain open, and when the resetting button 108 is released, the spring 112 returns the reset button and stem 106 to downwardly projected position as shown. As the reset stem moves downwardly the valve member 120 engages the seat 118 to seal the passage around the stem against the escape of fuel. The plug or shutoff cock 95 can then be rotated to open the port 102 in order to supply fuel to the main burner 10. If, on the other hand, the pilot burner is not lighted to produce the thermo-electric current for holding the valve 62 open, this valve will move to closed position upon release of the button 108 so that no gas whatsoever will flow from the inlet to the pilot burner and main burner.

In order to turn on or shut off the supply of fuel to the main burner, for example with the pilot light burning and the armature 55 held in attracted position and valve 62 open, the handle member 104 is grasped and turned to rotate the plug member 95. With the opening 102 in complete register with the outlet 22 as shown, the device is completely open for maximum supply of fuel to the main burner. By rotating the plug 95 until the opening 102 is completely out of register with the outlet 22, the supply of fuel through the outlet 22 and thereby the supply of fuel to the main burner is completely shut off. Intermediate supplies of fuel through the outlet 22 may be provided by intermediate amounts of registration of the opening 102 with the outlet 22.

From the foregoing description it will be apparent that the shutoff cock and reset means for the thermo-electric control device and the interlock therebetween are of simple and inexpensive construction and are adapted to be applied to and removed from the valve body 20 or similar structure expeditiously and as a unitary structure. The shutoff cock and reset and interlock unit, when applied to the valve body 20, constitute a unitary part of the control device, and the device is adapted to be operated conveniently and effectively and requires less joints or connections in the fuel supply line. The device is composed of relatively few parts as compared with separate devices, and the parts are adapted for convenient manufacture and assembly.

I do not intend to be limited to the precise details shown or described.

I claim:

1. In a device of the character described, in combination, a control device having an electromagnet provided with an armature connected to a controlling member and adapted when energized to hold said member in operating position and when deenergized to release said member for movement to a safety position, a shutoff cock, reset means for resetting said armature to attracted position and said controlling member to operating position, and means for preventing the resetting operation of said reset means except when said shutoff cock is closed.

2. In a device of the character described, in combination, a control device having an electromagnet provided with an armature connected to a controlling member and adapted when energized to hold said member in operating position and when deenergized to release said member for movement to a safety position, a shutoff cock mounted in said control device, a reset stem mounted in said shutoff cock and operable to reset said armature to attracted position and said controlling member to operating position, and interlock means between said reset stem and said shutoff cock for preventing resetting operation of said reset stem except when said shutoff cock is closed.

3. In a device of the character described, in combination, a valve body having inlet and outlet openings and provided at one end with an electromagnet having an armature connected to a valve member within said valve body and adapted when energized to hold said valve member in open position and when deenergized to release said valve member for movement to closed position, the opposite end of said valve body having a generally conical bore, a generally conical shutoff cock mounted in said bore for controlling the flow through said valve body, a reset stem mounted in said shutoff cock and operable to reset said armature to attracted position and said valve member to open position, and interlock means between said reset stem and said shutoff cock for preventing resetting operation of said reset stem except when said shutoff cock is closed.

4. In a device of the character described, in combination, a valve body having an electromagnet provided with an armature connected to a valve member within the valve body and adapted when energized to hold said valve member in open position and when deenergized to release said valve member for movement to closed position, a shutoff cock mounted in the valve body for controlling the flow through said valve body, a reset stem mounted in said shutoff cock and operable to reset said armature to attracted position and said valve member to open position, and a detent mounted for lateral movement in said shutoff cock, said detent having interlocking engagement with said reset stem to prevent resetting operation of said stem when said shutoff cock is in open position and freed for movement out of interlocking engagement with said reset stem to permit resetting operation of said stem when said shutoff cock is closed.

5. In a device of the character described, in combination, a valve body having an electromagnet provided with an armature connected to a valve member within the valve body and adapted when energized to hold said valve member in open position and when deenergized to release said valve member for movement to closed position, a shutoff cock mounted in the valve body for controlling the flow through said valve body, a reset stem mounted in said shutoff cock and operable to reset said armature to attracted position and said valve member to open position, a detent mounted for lateral movement in said shutoff cock, said detent having interlocking engagement with said reset stem to prevent resetting operation of said stem when said shutoff cock is in open position and freed for movement out of interlocking engagement with said reset stem to permit resetting operation of said stem when said shutoff cock is closed, and spring means engaging said detent and normally holding same in position for interlocking engagement with said reset stem.

6. In a device of the character described, in combination, a valve body having an electromagnet provided with an armature connected to a valve member within the valve body and adapted when energized to hold said valve member in open position and when deenergized to release said valve member for movement to closed position, a shutoff cock mounted in the valve body for controlling the flow through said valve body, a reset stem mounted in said shutoff cock and operable to reset said armature to attracted position and said valve member to open position, a detent mounted for lateral movement in said shutoff cock, said detent having interlocking engagement with said reset stem to prevent resetting operation of said stem when said shutoff cock is in open position and freed for movement out of interlocking engagement with said reset stem to permit resetting operation of said stem when said shutoff cock is closed, and a valve member carried by said reset stem for sealing the valve body against leakage along said reset stem.

7. In a device of the character described, in combination, a valve body having an electromagnet provided with an armature connected to a valve member within the valve body and adapted when energized to hold said valve member in open position and when deenergized to release said valve member for movement to closed position, a shutoff cock mounted in the valve body for controlling the flow through said valve body, a reset stem mounted in said valve body and operable to reset said armature to attracted position and said controlling member to operating position, and a detent mounted for lateral movement in said shutoff cock, said valve body having an opening in the plane of said detent, said detent being positioned for registration with said opening when the shutoff cock is in closed position and out of register with said opening when the shutoff cock is open, said reset stem being freed for resetting operation by actuating said detent into said opening when the shutoff cock is closed and locked against resetting operation by engagement of said detent with the valve body when the shutoff cock is open.

8. In a device of the character described, in combination, a valve body having an electromagnet provided with an armature connected to a valve member within the valve body and adapted when energized to hold said valve member in open position and when deenergized to release said valve member for movement to closed position, a shutoff cock mounted in the valve body for controlling the flow through said valve body, a reset stem mounted in said valve body and operable to reset said armature to attracted position and said controlling member to operating position, a detent mounted for lateral movement in said shutoff cock, said valve body having an opening in the plane of said detent, said detent being positioned for registration with said opening when the shutoff cock is in closed position and out of register with said opening when the shutoff cock is open, said reset stem being freed for resetting operation by actuating said detent into said opening when the shutoff cock is closed and locked against resetting operation by engagement of said detent with the valve body when the shutoff cock is open, and a spring secured to the shutoff cock and engaging said detent normally to maintain same yieldingly out of the opening in the valve body.

9. In a device of the character described, in combination, a valve body having an electromagnet provided with an armature connected to a valve member within the valve body and adapted when energized to hold said valve member in open position and when deenergized to release said valve member for movemnt to closed position, a shutoff cock mounted in the valve body for controlling the flow through said valve body, a reset stem mounted in said valve body and operable to reset said armature to attracted position and said controlling member to operating position, a detent mounted for lateral movement in said shutoff cock, said valve body having an opening in the plane of said detent, said detent being positioned for registration with said opening when the shutoff cock is in closed position and out of register with said opening when the shutoff cock is open, said reset stem being freed for resetting operation by actuating said detent into said opening when the shutoff cock is closed and locked against resetting operation by engagement of said detent with the valve body when the shutoff cock is open, and a stop member splined upon said shutoff cock and having a lug engaging in the opening in the valve body for limiting rotation of said shutoff cock.

10. In a device of the character described, in combination, a valve body having an electromagnet provided with an armature connected to a valve member within the valve body and adapted when energized to hold said valve member in open position and when deenergized to release said valve member for movement to closed position, a shutoff cock mounted in the valve body for controlling the flow through said valve body, a reset stem mounted in said valve body and operable to reset said armature to attracted position and said controlling member to operating position, a detent mounted for lateral movement in said shutoff cock, said valve body having an opening in the plane of said detent, said detent being positioned for registration with said opening when the shutoff cock is in closed position and out of register with said opening when the shutoff cock is open, said reset stem being freed for resetting operation by actuating said detent into said opening when the shutoff cock is closed and locked against resetting operation by engagement of said detent with the valve body when the shutoff cock is open, a stop member splined upon said shutoff cock and having a lug engaging in the opening in the valve body for limiting rotation of said shutoff cock, a spring cap attached to the valve body, and a spring interposed between said stop member and said cap for maintaining the shutoff cock seated in the generally conical bore in said valve body.

11. In a device of the character described, in combination, a valve body, a shutoff cock mounted in said valve body for controlling the flow through said valve body, a reset stem mounted in said shutoff cock, means adapted to be reset by said reset stem, and detent means mounted in said shutoff cock for preventing operation of said reset stem except when said shutoff cock is closed.

12. In a device of the character described, in combination, a valve body, a shutoff valve mounted in said valve body for controlling the flow through said body, reset means mounted for reciprocatory movement in said shutoff valve, means adapted to be reset by said reset means, and means for preventing reciprocatory movement of said reset means except when said shutoff valve is closed.

13. In a device of the class described, in combination, a valve body, a shutoff valve mounted in said valve body, reset means mounted for resetting operation in said valve, means adapted to be reset by said reset means, and internally disposed means for preventing operation of said reset means when said valve is open and permitting resetting operation of said means when said valve is closed.

14. In a device of the class described, a shutoff valve, a reset stem mounted for reciprocatory movement, means adapted to be reset by reciprocatory movement of said stem, and means cooperable with said stem and movable laterally thereof when the valve is closed to permit operation of said reset means, said last means being held against lateral movement to prevent operation of said reset means when said valve is open.

15. In a device of the class described, thermoelectric safety means, a shutoff valve, reset means for resetting said thermoelectric safety means, and means for preventing the resetting operation of said reset means except when said valve is closed.

16. In a device of the class described, thermoelectric safety means, a controlling member having different positions, reset means for resetting said thermoelectric safety means, and means for preventing the resetting operation of said reset means when said controlling member is in one position and free to permit the resetting operation of said reset means when said controlling member is in a different position.

17. In a device of the character described, in combination, a control body, a controlling member mounted in said body and having at least two different positions, reset means, means adapted to be reset by said reset means, and means disposed within said control body for preventing operation of said reset means when said controlling member is in one of said positions and permitting operation of said reset means when said controlling member is in a different position.

18. In a device of the class described, in combination, a shutoff valve mounted for movement to different positions, reset means mounted for operation in said valve, means adapted to be reset by said reset means, abutment means, and means mounted in said valve and cooperable with said reset means and with said abutment means for preventing operation of said reset means when said valve is in one position and free to permit operation of said reset means when said valve is in another position.

HAROLD A. MANTZ.

DISCLAIMER 2,213,844.—*Harold A. Mantz*, Milwaukee, Wis. SAFETY CONTROL AND SHUTOFF DEVICE. Patent dated September 3, 1940. Disclaimer filed January 31, 1944, by the assignee, *Milwaukee Gas Specialty Company*; the inventor, assenting.

Hereby enters this disclaimer to claims 1, 14, 15, and 16 of said patent.

[*Official Gazette February 29, 1944.*]

DISCLAIMER 2,213,844.—*Harold A. Mantz*, Milwaukee, Wis. SAFETY CONTROL AND SHUTOFF DEVICE. Patent dated September 3, 1940. Disclaimer filed January 31, 1944, by the assignee, *Milwaukee Gas Specialty Company*; the inventor, assenting.

Hereby enters this disclaimer to claims 1, 14, 15, and 16 of said patent.

[*Official Gazette February 29, 1944.*]